United States Patent
Ong (10) Patent No.: US 8,620,611 B2
(45) Date of Patent: Dec. 31, 2013

(54) METHOD OF MEASURING MULTI-PHASE FLUID FLOW DOWNHOLE

(75) Inventor: Joo Tim Ong, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 575 days.

(21) Appl. No.: 12/851,322

(22) Filed: Aug. 5, 2010

(65) Prior Publication Data

US 2011/0040485 A1  Feb. 17, 2011

Related U.S. Application Data

(60) Provisional application No. 61/233,711, filed on Aug. 13, 2009.

(51) Int. Cl.
*G06F 19/00* (2011.01)
*G01V 9/00* (2006.01)

(52) U.S. Cl.
USPC .............................................. 702/100; 702/12

(58) Field of Classification Search
USPC .................................................. 702/100, 12
See application file for complete search history.

(56) References Cited

U.S. PATENT DOCUMENTS

| | | | | |
|---|---|---|---|---|
| 6,253,624 | B1 * | 7/2001 | Broden et al. | 73/861.44 |
| 6,463,810 | B1 * | 10/2002 | Liu | 73/861.63 |
| 7,240,568 | B2 * | 7/2007 | Atkinson | 73/861.63 |
| 2004/0011139 | A1 | 1/2004 | Daniel et al. | |
| 2004/0031330 | A1 * | 2/2004 | Richards et al. | 73/861.21 |
| 2005/0138993 | A1 * | 6/2005 | Mattar et al. | 73/61.78 |
| 2005/0188771 | A1 | 9/2005 | Lund Bo et al. | |
| 2007/0193369 | A1 * | 8/2007 | Evans et al. | 73/861.52 |
| 2008/0034890 | A1 * | 2/2008 | Barua et al. | 73/861.354 |
| 2008/0066559 | A1 | 3/2008 | Johansen et al. | |
| 2009/0000390 | A1 | 1/2009 | Duhanyan et al. | |

OTHER PUBLICATIONS

International Search Report and Written Opinion for PCT/US 2010/045469, dated Apr. 7, 2011, 8 pages.

\* cited by examiner

*Primary Examiner* — Alexander H Taningco
*Assistant Examiner* — Haihui Zhang
(74) *Attorney, Agent, or Firm* — Bracewell & Giuliani LLP (57) ABSTRACT

Multi-phase flow is estimated in a flow meter by measuring fluid pressure within the flow meter and using the measured pressure to calculate a density of the flow. A total flow rate through the flow meter is estimated based on the calculated density and a PVT analysis of the fluid. A corrected total mass flow rate is calculated using a liquid/gas slip correction technique. Fluid flow rates are further corrected with a discharge coefficient that varies with changes in the Reynolds number of the fluid. The gas and oil fractions can be determined from the corrected total mass flow rate and gas fraction.

10 Claims, 5 Drawing Sheets

METHOD OF MEASURING MULTI-PHASE FLUID FLOW DOWNHOLE

RELATED APPLICATIONS

This application claims priority to and the benefit of U.S. Provisional Application No. 61/233,711, filed on Aug. 13, 2009, the full disclosure of which is hereby incorporated by reference herein.

FIELD OF THE INVENTION

This invention relates in general to wellbore fluid production and more specifically to a method of measuring multiphase fluid flow using a flow meter.

BACKGROUND OF THE INVENTION

Flowmeters are often used for measuring flow of fluid produced from hydrocarbon producing wellbore. The flowmeter may be deployed down hole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. In some instances transmission lines may include fluid produced from wells having different owners. Therefore proper accounting requires a flow measuring device that monitors the flow contribution from each owner.

The produced fluid may include water and/or gas mixed with liquid hydrocarbon. Knowing the water fraction is desirable to ensure adequate means are available for separating the water from the produced fluid. Additionally, the amount and presence of gas is another indicator of wellbore performance, and vapor mass flow impacts transmission requirements. Flowmeters can be employed that provide information regarding total flow, water cut amount, and gas fractions. However, these often require periodic analysis of the fluid entering the flowmeter. This may involve deploying a sample probe upstream of the flowmeter; which can produce inaccuracy, and may interrupt or temporarily halt fluid production.

SUMMARY OF THE INVENTION

Disclosed herein is a method of estimating fluid flow through a flow meter. In an example embodiment the method includes flowing fluid through the flow meter, and using pressure readings in the flow meter to estimate a bulk density of the flow stream. The respective amounts of gas and liquid flow in the flow stream can be determined based on the estimate of bulk density and properties of fluid making up the flow stream. The flow meter may have an overreading error due to slippage between the gas and liquid, the overreading error can be found based on the amounts of gas and liquid flow and properties of fluid making up the flow stream. Using the overreading error, the amounts of the gas and liquid flow are recalculated using the estimated overreading error. Further recalculation of gas and liquid flow occurs using a discharge coefficient based on the recalculation of flows using the overreading error. The PVT analysis can be done using fluid sampled from the flow stream that is analyzed for deriving the properties of fluid making up the flow stream for a range of pressure and temperature based on the analysis. Alternatively, a bulk flow rate of the flow stream can be found based on the estimate of bulk density and properties of fluid making up the flow stream. The bulk flow rate of the flow stream can be recalculated based on the reestimates of the gas and liquid flow. In an example embodiment, a Reynolds number is calculated for the recalculated gas and liquid flows that is used to determine the discharge coefficient. In one alternative, the reestimated gas flow is based on the discharge coefficient and the overreading error when the gas volume fraction is greater than 50%, and the reestimated gas flow is based on the discharge coefficient when the gas volume fraction is less than or equal to 50%. In one example, the flow meter is disposed in a wellbore tubular and the flow stream exits the flow meter into the tubular and is conveyed to a wellhead at a surface. Optionally, the method may include estimating an amount of liquid to gas phase change in the flow stream between the flow meter and the wellhead based on a property of the fluid making up the flow stream. In an alternative example, the respective rates of gas flow and liquid flow in the flow stream are found at the wellhead based on the amount of liquid to gas phase change. The flow meter can be a Venturi type flow meter.

In an alternative embodiment, a method of estimating multi-phase fluid flow through a flow meter is provided herein that includes sampling fluid from a wellbore and conducting a PVT analysis of the sampled fluid. A flow meter is provided in the wellbore so that wellbore fluid flows through the flow meter and pressure of the fluid in the flow meter is measured at different elevations in the flow meter. Based on the pressure measurements in the flow meter, the density of fluid in the wellbore is estimated and used to calculate a flow through the flow meter. The calculated flow is compensated for over reading in the flow meter by estimating a new flow rate through the flow meter and recalculating the flow estimate based on a Reynolds Number for the new flow rate. Optionally, the method can include estimating a phase fraction of the fluid in the wellbore based on comparing the density measurements and fluid properties. In an alternative example, a new discharge coefficient is determined for the flow meter based on the new flow rate. Alternatively, a flow rate for each phase fraction of the fluid in the wellbore can be reestimated by multiplying the flow estimate with the phase fraction of the fluid. The flow meter can be a venturi meter, a flow orifice meter, or a flow nozzle meter. Multiple flow meters can be provided in a single wellbore.

In an example of the method disclosed herein, fluid is sampled and analyzed at conditions such as pressure, temperature, and/or volume, that can vary over time. The fluid analysis can include obtaining fluid properties, such as density, viscosity, gas oil ratio, and formation volume factor, at the different conditions. Moreover, when the fluid includes more than one physical phase, e.g. liquid and/or gas, the fluid properties of each phase are measured. The liquid can include connate fluid having hydrocarbons, and in some situations water as well. Additional examples of liquids include drilling fluids, and wellbore treatment fluids. In one example, tables are created correlating the raw data for each type of fluid property with their corresponding pressure and temperature. From the tables, polynomial expressions may be derived that model the data with changing fluid conditions. The expressions can be a first, second, third, fourth, or fifth order polynomial.

BRIEF DESCRIPTION OF THE DRAWINGS

Some of the features and benefits of the present invention having been stated, others will become apparent as the description proceeds when taken in conjunction with the accompanying drawings, in which.

It will be understood the improvement described herein is not limited to the embodiments provided. On the contrary, the present disclosure is intended to cover all alternatives, modifications, and equivalents, as may be included within the spirit and scope of the improvement as defined by the appended claims.

DETAILED DESCRIPTION OF THE INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

Figure 1:
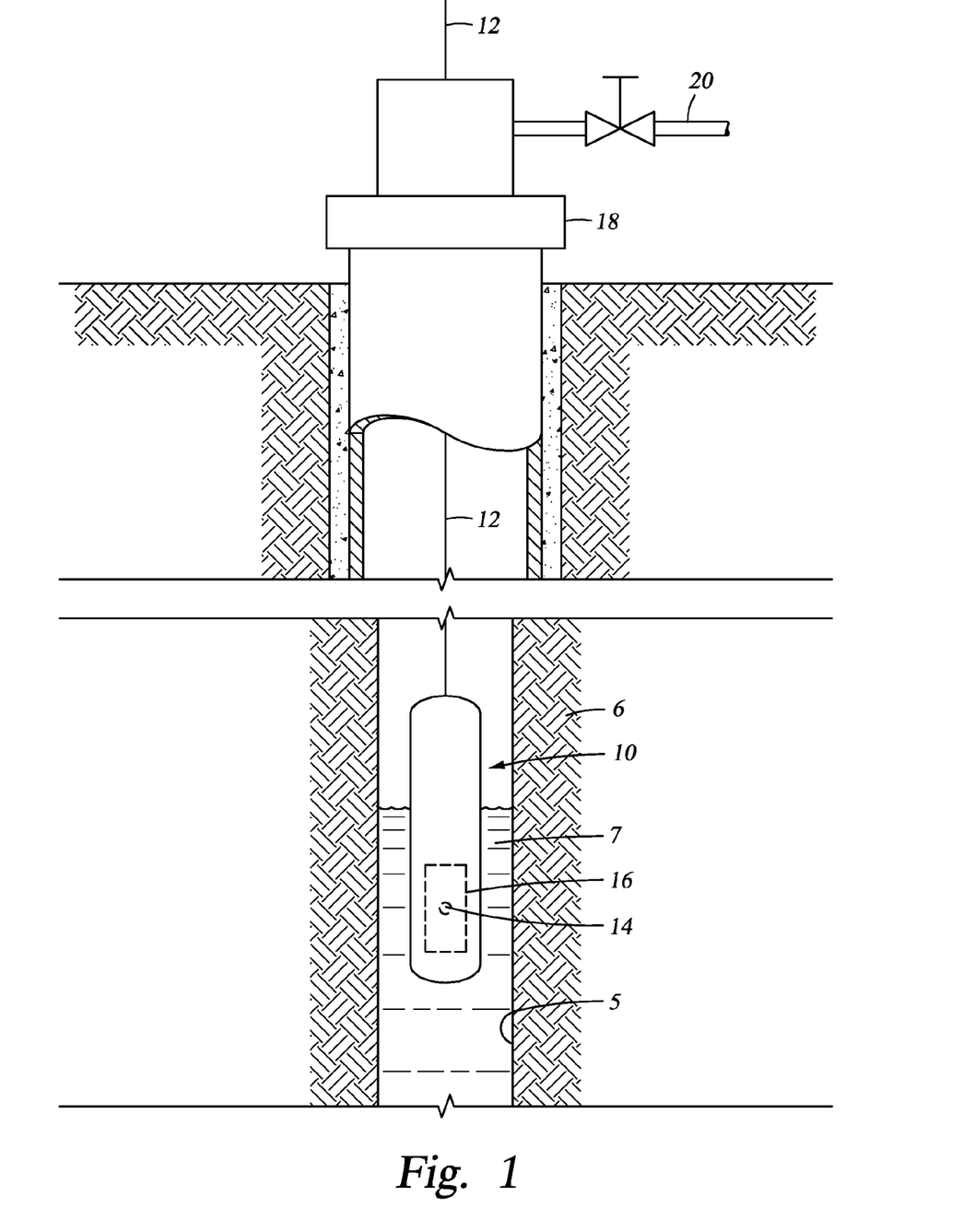
FIG. 1 is a side partial cut-away view of a tool sampling fluid in a wellbore.

In FIG. 1, a side partial sectional view is shown of a sonde 10 disposed within a wellbore 5 for sampling fluid 7 in the wellbore 5. The wellbore fluid 7 can include fluids used during drilling or completion, fluid from a formation 6 through which the wellbore 5 is formed, or combinations of these fluids. Although shown disposed on wireline 12, the sonde 10 can be deployed on tubing, slickline, a drill string, or any other method of inserting/retrieving a sonde from within a borehole. The fluid 7 may be sampled by the sonde 10 through a selectively openable port 14 in fluid communication with a sample tank 16 stored in the sonde 10. Sampling the fluid 7 with the sonde 10 can take place prior to or after fluids are produced from the wellbore 5. The sample tank 16 can be sealed after sampling the fluid for subsequent analysis. Analysis of the fluid 7 stored in the sample tank 16 can occur at surface, such as in a laboratory. Moreover, the sample tank 16 can be sealed to maintain the sampled fluid at the pressure and/or temperature when sampled so that more accurate analysis results can be obtained. Optionally, the wellbore fluid 7 can be sampled by delivering the fluid 7 to a wellhead 18 depicted on top of the wellbore 5. A valved production line 20 can be used for sampling fluid from the wellhead 18. Production tubing (not shown) can convey the fluid 7 to the wellhead 18 from within the wellbore 5.

Figure 2:
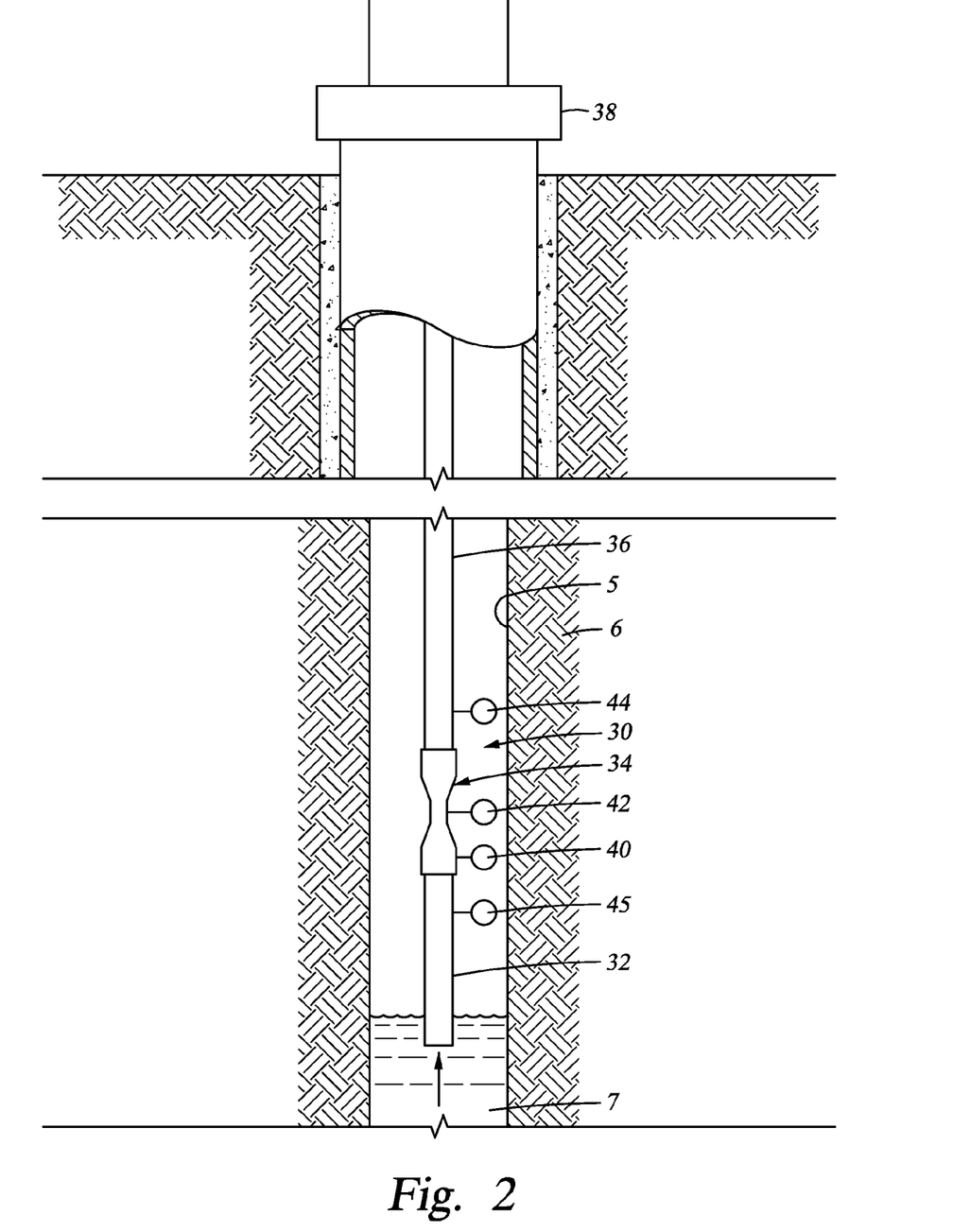
FIG. 2 is a side cut-away view of an embodiment of a flow measurement system.

FIG. 2 schematically illustrates in a side partial sectional view a flow measurement system 30 disposed in the wellbore 5. The flow measurement system 30 can be disposed in the wellbore 5 after sampling fluid 7 with the sonde 10 (FIG. 1). The system 30 of FIG. 2 includes inlet tubing 32 that delivers the wellbore fluid 7 to an attached flow meter 34. Exit tubing 36 is shown connected on an end of the flow meter 34 opposite the inlet tubing 34 and terminating at a wellhead assembly 38 above the wellbore 5. The exit tubing 36 is in fluid communication with the flow meter 34 and the wellhead assembly 38 at its opposite end, so that flow within the inlet tubing 32 is directed to the wellhead assembly 38. In one embodiment, the inlet and exit tubing 32, 36 includes production tubing used in producing fluid 7 from the wellbore 5.

In an example embodiment, wellbore fluid 7 flows through the flow meter 34 and experiences a temporary pressure drop in the flow meter 34. The pressure drop can be estimated by monitoring fluid conditions, such as pressure and/or temperature. A sensor 40 depicted at about the inlet of the flow meter 34 of FIG. 2 can measure pressure and/or temperature of wellbore fluid 7 entering the flow meter 34. Optionally, the sensor 40 can be set on the inlet tubing 32, exactly at the flow meter 34 inlet, or within the flow meter 34. Another sensor 42 is shown provided along the flow meter 34 that also can be used for measuring pressure and/or temperature. Shown in FIG. 2, the sensor 42 is at about the flow meter 34 midsection; however depending on the type of flow meter 34 used, the sensor 42 could be situated at different points along the flow meter 34. For example, the sensor 42 can be strategically positioned so that comparing respective pressure measurements of the sensors 40, 42 can yield a measurement of pressure drop across the entire flow meter 34, or across a portion of the flow meter 34.

An additional sensor 44 is illustrated on the exit tubing 36 between the flow meter 34 and the wellhead assembly 38. Optionally, an upstream sensor 45 may be included as shown on the inlet tubing 32 and spaced away from the flow meter 34. Example distances between the flow meter 34 and sensors 44, 45 include about 1 foot, 5 feet, 10 feet, 50 feet, 100 feet, 150 feet, 200 feet, 250 feet, 300 feet, 350 feet, 400 feet, 500 feet, and distances in between these values. The sensors 44, 45 can be used for measuring pressure, temperature, and/or density. The sensors 40, 42, 44, 45 can include piezoelectric devices, thermocouples, densitometers, any other device form measuring pressure, temperature, fluid density, or other fluid properties, and combinations thereof. Example densitometers include radiation type as well as capacitive inductance type. The sensors 40, 42, 44, 45 can be in direct contact with the fluid 7, connect to probes that extend into the fluid, or couple to a barrier on a side opposite the fluid 7.

In an example of use of the flow measurement system 30 of FIG. 2, a pressure differential between the flow meter 34 and sensor 44 can be estimated by monitoring pressure values obtained from sensors 40, 42, 44. Bulk density of the fluid 7 flowing through the meter 34 can be derived from the elevation (or depth) difference(s) between the sensors 40, 42, 44, and differences in the corresponding pressures as measured by the sensors 40, 42, 44. In an alternative embodiment, sensor 44 directly measures the bulk density of the fluid 7. The expression in equation 1.0 may be used for measuring density of the fluid 7 flowing through the meter. In an alternate example, measurements from sensor 45 can be used to estimate density of the fluid 7.

$$\rho_{measured} = \frac{144 \cdot (DP_{remote,cor} - \lfloor (\Delta H_{PPL} + \Delta H_{fric} + \Delta H_{accel}) \cdot (DP_{throat,cor}) \rfloor)}{TVD} \quad \text{Calculate Fluid Density}$$ (Eq 1.0)

Where:

$$DP_{throat,cor} = (P_{inlet} - P_{throat} + \Delta P_{fm,static});$$ (Eq. 1.1)

$$DP_{remote,cor} = (P_{inlet} - P_{remote} + \Delta P_{remote,static});$$ (Eq. 1.2)

$$\Delta H_{PPL} = (0.436 - 0.86\beta + 0.59\beta^2) \quad \text{(dimensionless)};$$ (Eq. 1.3)

$$\Delta H_{fric} = \frac{4fL(C_d)^2}{(1-\beta^4)} \frac{(D_{throat})^4}{(D_{remote})^5} \quad \text{(dimensionless)};$$ (Eq. 1.4)

$$\Delta H_{accel} = \frac{(C_d)^2 \beta^4}{(1-\beta^4)} \left[ \left(\frac{D_{inlet}}{D_{remote}}\right)^4 - 1 \right] \quad \text{(dimensionless)};$$ (Eq. 1.5)

and

Where:

β is known as the Beta factor and is typically supplied by the flow meter manufacturer;

TVD is true vertical depth;

f is the friction factor; and

L is the measured distance between the flow meter inlet and the remote location.

Equation 1.0 considers potential energy of the fluid, also referred to herein as static head, through inclusion of the true vertical depth of the fluid being measured. Also, kinetic energy is accounted for by considering the dynamic losses through friction and acceleration.

The gas fraction of fluid 7 flowing through flow meter 34 can be estimated from the measured bulk density (eq. 1.0) of the sampled fluid. Equation 2.0 provides an example of determining a value for the gas volume fraction (GVF).

$$GVF = \frac{(\rho_o - \rho_{measured})}{(\rho_o - \rho_g)}$$ (Eq. 2.0)

Accessing a data table or polynomial model, values for oil density ($\rho_o$) and gas density ($\rho_g$) are obtained that correspond to the measured pressure and temperature.

A bulk flow rate through the flow meter 34 can be calculated using equation 3.0 provided below.

$$Q_{bulk} = \frac{C_d \cdot a_2}{\sqrt{1-\beta^4}} \times \sqrt{\frac{2 \cdot g \cdot (P_{inlet} - P_{throat})}{\rho_{measured}}}$$ (Eq. 3.0)

Where $a^2$ is area at the throat (where the diameter is most narrow in the flow meter) and $C_d$ is the discharge coefficient. Here the discharge coefficient is set at a static value of 0.995; however as described in more detail below, subsequent iterations will use a varying $C_d$ value dependent upon the Reynolds Number of the fluid.

Figure 3A:
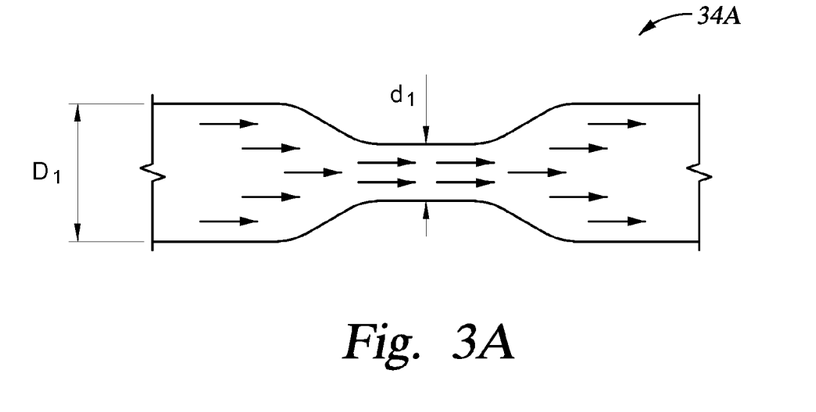
FIGS. 3A-3C are side partial sectional views of example embodiments of flow meters.
Figure 3B:
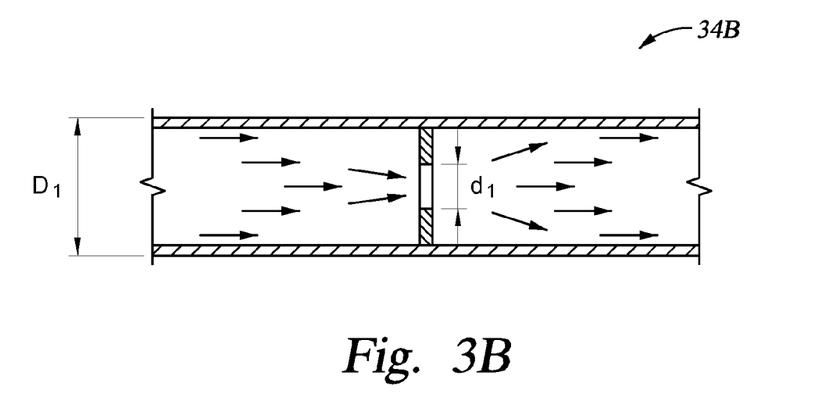
Figure 3C:
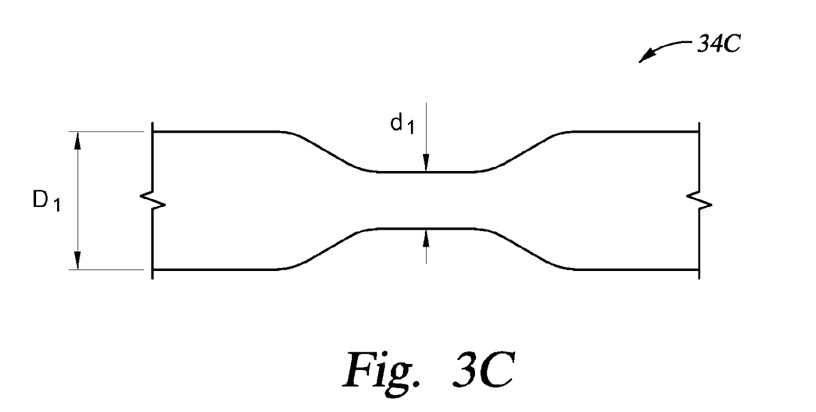

Example flow meters are shown in side partial sectional view in FIGS. 3A-3C. Flow meter 34A shown in FIG. 3A represents a venture type flow meter with an inner diameter $d_1$ within the meter 34A that is less than the entrance diameter $D_1$. Provided in FIG. 3B, flow meter 34B represents an orifice type flow meter, having a disc 46 perpendicularly provided in the fluid flow path and an orifice 48 in the disc 46. The orifice diameter $d_1$ is less than the flow meter 34B entrance diameter $D_1$. In FIG. 3C, flow meter 34C represents a flow nozzle type of flow meter similar to the venturi type flow meter of FIG. 3A, but having smoother transition between the entrance and inner diameters $D_1$, $d_1$. As is known, the reduced diameter at $d_1$ increases fluid velocity temporarily to produce a corresponding pressure drop within the flow meter. Measuring the pressure drop can yield a flow rate through the meter.

In an example, the volumetric flow through the flow meter 34 is estimated based on the fluid flow pressure drop within the flow meter 34. A difference between the pressures measured by sensor 40 and sensor 42 and corresponding entrance and inner diameters of the flow meter can be used to derive a flow rate Q through the flow meter 34. The relationship between pressure drop and entrance/inner diameter $D_1$, $d_1$ is dependent on the type of flow meter used. Those skilled in the art are capable of identifying a proper pressure drop and diameter correlation to obtain a flow rate Q.

From the bulk flow rate $Q_{bulk}$ above, if the fluid includes more than one phase, the volumetric flow rates for each phase can be determined. In the example where the fluid includes gas and oil, the bulk flow rate of oil $Q_o=(1-GVF) \times Q_{bulk}$ (Eq. 4.1) and the bulk flow rate of gas $Q_g=GVF \times Q_{bulk}$ (Eq. 4.2).

Inaccuracies due to slip effect may skew two phase fluid flow measurements taken with a flow meter. Slip effect is caused by the mix of vapor and liquid in the fluid that produces a phenomenon referred to herein as over reading. Changes in vapor density with pressure also introduce inaccuracies in measuring fluid flow. Accurately calculating the mass flow involves correcting the differential pressure measurement for the effect of gas compression and slip effects. In one embodiment the present method employs a modified form of the De Leeuw correction to compensate for these effects. This includes first determining the Froude Number (Fr), which can be found for each phase in the fluid.

$$Fr_g = \frac{v_{s,g}}{\sqrt{gD_n}} \sqrt{\frac{\rho_g}{\rho_o - \rho_g}}$$ (Eq. 5.1)

$$Fr_o = \frac{v_{s,o}}{\sqrt{gD_n}} \sqrt{\frac{\rho_o}{\rho_o - \rho_g}}$$ (Eq. 5.2)

Where $v_{s,o}$ and $v_{s,g}$ are the superficial velocity respectively for oil and gas.

$$v_{s,g} = \frac{Q_g}{D_n} \quad \text{(Eq. 5.3)}$$

$$v_{s,o} = \frac{Q_o}{D_n} \quad \text{(Eq. 5.4)}$$

Where:

$D_n$ is the flow medium diameter where the fluid is being evaluated, e.g. inlet, throat, or downstream; and g is the acceleration due to gravity (32.174 ft/s$^2$).

Using the Froude values obtained above, the slip effect between the gas and liquid phase can be evaluated using the Lockhart-Martinelli number X, the relationship for which is found in equation 6.0.

$$X = \frac{Fr_o}{Fr_g} \quad \text{(Eq. 6.0)}$$

When the fluid being measured is a wellbore downhole fluid, the fluid densities can be obtained utilizing pressure and temperature readings. The gas can be assumed to be methane, while liquids can initially be collected and evaluated during drilling. Analyzing the liquids collected during drilling can provide an initial estimate of borehole liquid density. During the time the flowmeter 34 is in use downhole, fluids may be collected and analyzed at surface to correct for changes in liquid composition that affect fluid properties. Knowing the LM number, the over reading value can be calculated using equations 7.1 and 7.2 below:

$$\text{Over reading; } \phi = \sqrt{1 + CX + X^2} \quad \text{(Eq. 7.1)}$$

Ratio metric density;

$$C = \left(\frac{\rho_o}{\rho_g}\right)^n + \left(\frac{\rho_g}{\rho_o}\right)^n \quad \text{(Eq. 7.2)}$$

where: n=0.41 for $0.5 \leq Fr_g \leq 1.5$; and n=0.606(1−$e^{-0.746Fr_g}$) for Frg>1.5

The bulk flow rate $Q_{bulk}$ can be compensated for the slip effect by dividing it with the overreading factor $\phi$.

$$Q_{bulk,new1} = \frac{Q_{bulk}}{\varphi} \quad \text{(Eq. 8.0)}$$

As noted above, the present method includes an optional iteration based on the Reynolds Number of the fluid entering the flow meter. The Reynolds Number represents the ratio of a fluids momentum or inertia to the viscosity based forces acting on the fluid. A value for Reynolds Number may be obtained from equation 9.0 below.

$$Re = 1488 \frac{uD\rho}{\mu} \quad \text{(Eq. 9.0)}$$

where,

Re Reynolds number at flow meter inlet u Velocity of flow at flow meter inlet=$Q_{bulk}/A_{inlet}$ Q Flow rate as measured by flow meter $A_{inlet}$ Cross-sectional area at the flow meter inlet $D_{inlet}$ Diameter at the flow meter inlet $\rho$ Fluid density $\mu$ Fluid viscosity It has been discovered that the function by which flow model coefficients relate to the Reynolds Number can vary for different ranges of the Reynolds Number. Table 1 below provides a listing of functions relating the discharge coefficient $C_d$ and the corresponding range of Reynolds Numbers in which the function is applicable.

TABLE 1

| | |
|---|---|
| $C_d' = 0$ | Re = 0 |
| $C_d' = 0.1432 \log Re + 0.4653$ | 0 < Re < 2,000 |
| $C_d' = 0.03375 \log Re + 0.8266$ | 2,000 ≤ Re < 120,000 |
| $C_d' = -0.01351 \log Re + 1.0666$ | 120,000 ≤ Re < 200,000 |
| $C_d' = 1.015$ | Re ≥ 200,000 |

To compensate for the dynamically changing value of the discharge coefficient with a change in Reynolds Number, the new bulk flow rate $Q_{bulk,new1}$ is multiplied by the updated $C_d$ from Table 1.

$$Q_{bulk,new2} = C_d \cdot Q_{bulk,new1} \quad \text{(Eq. 10.0)}$$

The gas volume fraction of the fluid affects how much a flow measurement is offset by the slip effect. This is taken into account when determining a compensated volumetric bulk flow rate for oil and gas. As shown in equation 11.0 below, if the gas volume fraction is greater than 50%, the new gas flow rate is found by multiplying the gas volume fraction with the flow rate found from equation 10.0. If the gas volume fraction is less than or equal to 50%, the new gas flow rate is found by multiplying the gas volume fraction with the flow rate found from equation 3.0 and the discharge coefficient $C_d$ (Equation 11.1).

$$\text{if } GVF > 50\% : Q_{g,new} = GVF \cdot Q_{bulk,new2} \quad \text{(Eq. 11.0)}$$

$$\text{if } GVF \leq 50\% : Q_{g,new} = GVF \cdot Q_{bulk} \cdot C_d \quad \text{(Eq. 11.1)}$$

$$Q_{o,new} = (1 - GVF) Q_{bulk,new2} \quad \text{(Eq. 11.2)}$$

The oil flow rate to the surface $Q_{o,surface}$ can be obtained by dividing $Q_{o,new}$ by the formation volume factor of oil $B_o$. As noted above, $B_o$, can be obtained by accessing data from the sampled fluid taken at known pressure and temperature. Equation 12.0 below illustrates an example of how a value for the oil flow rate to the surface $Q_{o,surface}$ can be determined.

$$Q_{o,surface} = \frac{Q_{o,new}}{B_o} \quad \text{(Eq. 12.0)}$$

Determining the amount of gas flowing to the surface can be found by multiplying the value of the oil flow rate to the surface and the difference between the produced gas oil ratio downhole and produced gas oil ratio at the surface. An example of this is shown in equation 13.0 below.

$$Q_{g,breakout} = (GOR_S - GOR_P) \cdot Q_{o,surface} \quad \text{(Eq. 13.0)}$$

Summing the values from equations 11.0 or 11.1 and 13.0 provides a value for the total volumetric gas rate at the surface. This is provided in equation 14.0 below.

$$Q_{g,surface} = Q_{g,new} + Q_{g,breakout} \quad \text{(Eq. 14.0)}$$

Figure 4A:
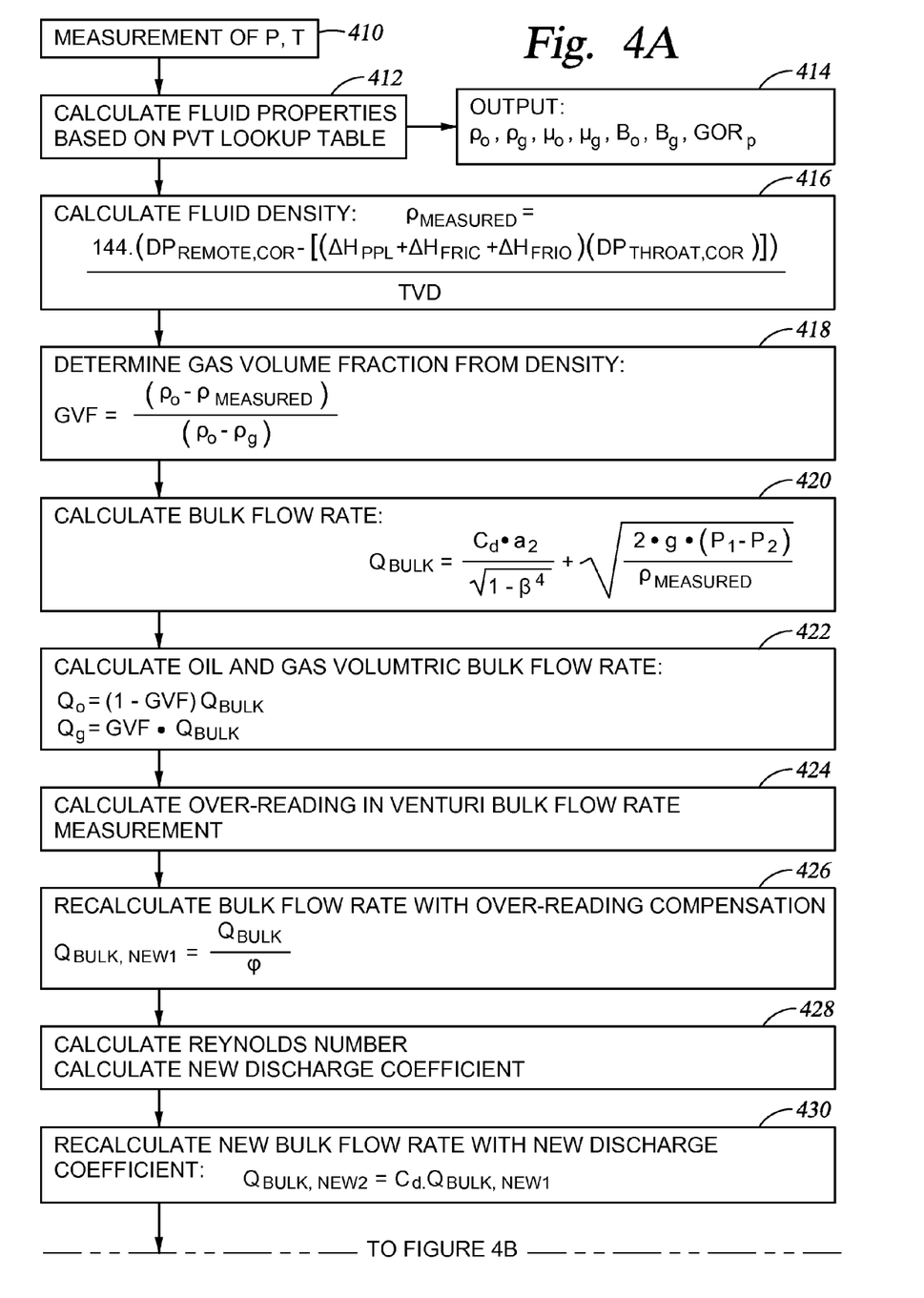
FIGS. 4A and 4B are schematics of an example method of use of a flow meter.
Figure 4B:
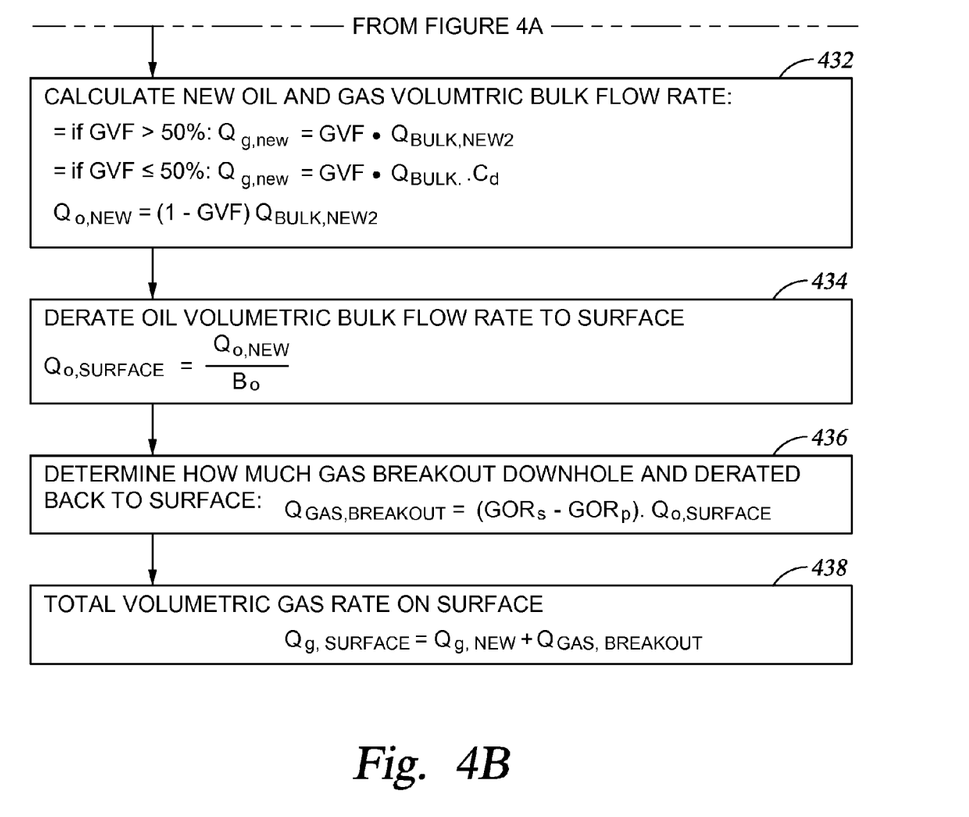

Shown in FIGS. 4A and 4B is an example method of an algorithm for measuring downhole fluid flow using a standard flow meter. With the flow meter disposed in a wellbore and within a fluid flow stream, pressure and temperature are measured of the fluid flow stream (step 410). Fluid is sampled from wellbore, either downhole or at the well surface, and the fluid properties are determined with respect to changing pressure and/or temperature (step 412). The fluid properties include gas oil ratio, and density, viscosity, and formation volume fraction for each phase in the fluid (step 414). Total fluid density is calculated using flow meter measurements (step 416) and gas volume fraction is calculated from the calculated density (step 418). A bulk flow rate is calculated using a flow meter dependent equation (step 420). From the gas volume fraction of step 418 and bulk flow rate of step 420, the oil and gas volumetric flow rate can be calculated (step 422). To account for slip in the multi-phase flow, over reading is calculated (step 424) and the bulk flow rate is compensated due to the calculated over reading (step 426) to obtain a new bulk flow rate. A new Reynolds Number and discharge coefficient $C_d$ (Table 1) is calculated based on the new bulk flow rate (step 428). The flow rate is compensated with the new discharge coefficient (step 430) to obtain another new flow rate. Referring now to FIG. 4B, gas and oil fractions are determined from the flow rate of step 430 (step 432). The volumetric gas and oil flows are derated to account for the flow to the surface (steps 434, 436). Using the derated gas flows and new gas flow of step 432, a total volumetric gas flow to the surface is determined (step 438).

In one example during about an 18 day period, gas and oil flow rates were measured at the surface of a well that was producing a multi-phase fluid. During the same time, flow in the wellbore was measured using a flow meter disposed in the well. Measured flows for oil and gas were determined from the flow meter data using a prior art method and the method of FIG. 4. The prior art method used a Venturi flow meter and a pressure gauge above or below the flow meter. The density was found through a hydrostatic head measurement, but the fluid density calculation did not correct for frictional or acceleration losses. Moreover, the prior art method assumed a zero gas fraction downhole, and relied on equations 4.1 and 4.2 above to estimate gas and oil fractions. Results from the prior art method found a surface measured oil flow that ranged from about 4900 to just under 4000 standard barrels per day. The prior art flow meter method measured from about 5100 to about 5000 standard barrels per day. The gas flow measured at the surface ranged from about 7800 to about 8200 MMSCF/D. The prior art flow meter method was unable to detect a gas flow and returned flow values at essentially nil. The method of FIG. 4 yielded oil flows ranging from just under 4500 to about 3900 standard barrels per day and gas flow rates of about 9800 to about 7500 MMSCF/D. Thus, unlike the prior art method, the algorithm of the present disclosure enables two phase flow measurements downhole using standard flow meters. It should further be pointed out the results also were more accurate with increasing gas percentage in the flow. Accordingly, the present method has additional application for use in measuring "wet gas" flow.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the method disclosed herein can include more than one flow meter in a wellbore 5. The multiple flow meters can measure fluid from the same producing zone, such as in series, or can measure flow from different producing zones. The flow meters may be provided on separate strings of production tubing. Additionally, the present method can be used in a wellbore 5 in which gas and/or condensate is being injected. These and other similar modifications will readily suggest themselves to those skilled in the art, and are intended to be encompassed within the spirit of the present invention disclosed herein and the scope of the appended claims. While the invention has been shown in only one of its forms, it should be apparent to those skilled in the art that it is not so limited but is susceptible to various changes without departing from the scope of the invention.

The invention claimed is:

1. A method of estimating a rate of fluid flow with a flow meter comprising:
   (a) directing a flow stream through the flow meter and estimating a bulk density of the flow stream;
   (b) estimating respective amounts of gas and liquid flow in the flow stream based on the estimate of bulk density and properties of fluid making up the flow stream;
   (c) estimate an overreading error in the flow meter based on the amounts of gas and liquid flow of step (b) and properties of fluid making up the flow stream;
   (d) reestimating amounts of the gas and liquid flow of step (b) using the estimated overreading error; and
   (e) reestimating amounts of the gas and liquid flow of step (d) using a discharge coefficient of the flow meter based on a gas volume fraction of the reestimated amounts of the gas and liquid flow of step (d);
   further comprising estimating a Reynolds number for a combination of the gas and liquid flow of step (d), wherein the discharge coefficient of step (e) is based on the Reynolds number; and
   wherein when the gas volume fraction is greater than 50%, the reestimated gas flow of step (e) is obtained by multiplying the discharge coefficient with the gas flow of step (d), and wherein when the gas volume fraction is less than or equal to 50%, the reestimated gas flow of step (e) is obtained by multiplying the discharge coefficient with the gas flow of step (b).

2. The method of claim 1, further comprising sampling fluid from the flow stream, analyzing the sampled fluid, and deriving the properties of fluid making up the flow stream for a range of pressure and temperature based on the analysis.

3. The method of claim 1, further comprising estimating a bulk flow rate of the flow stream based on the estimate of bulk density and properties a fluid making up the flow stream.

4. The method of claim 3, further comprising reestimating a bulk flow rate of the flow stream based on the reestimate of the gas and liquid flow of step (d).

5. The method of claim 1, wherein the flow meter is disposed in a wellbore tubular and the flow stream exits the flow meter into the tubular and is conveyed to a wellhead at to surface.

6. The method of claim 1, further comprising estimating an amount of liquid to gas phase change in the flow stream between the flow meter and the wellhead based on a property of the fluid making up the flow stream.

7. The method of claim 5, further comprising estimating respective rates of gas flow and liquid flow in the flow stream at the wellhead based on the amount of liquid to gas phase change.

8. The method of claim 1, wherein the bulk density of step (a) is based on static head of the fluid along a vertical distance and dynamic fluid flow losses in the flow meter.

9. The method of claim 1, further comprising sensing pressure at locations selected from the list consisting of along the flow meter, downstream of the flow meter, upstream of the flow meter, and combinations thereof.

10. The method of claim 1, wherein the flow meter is Venturi type flow meter.

\* \* \* \* \*